(No Model.)
G. W. TONEY & M. V. LIVINGSTON.
PNEUMATIC TIRE.
No. 472,411. Patented Apr. 5, 1892.
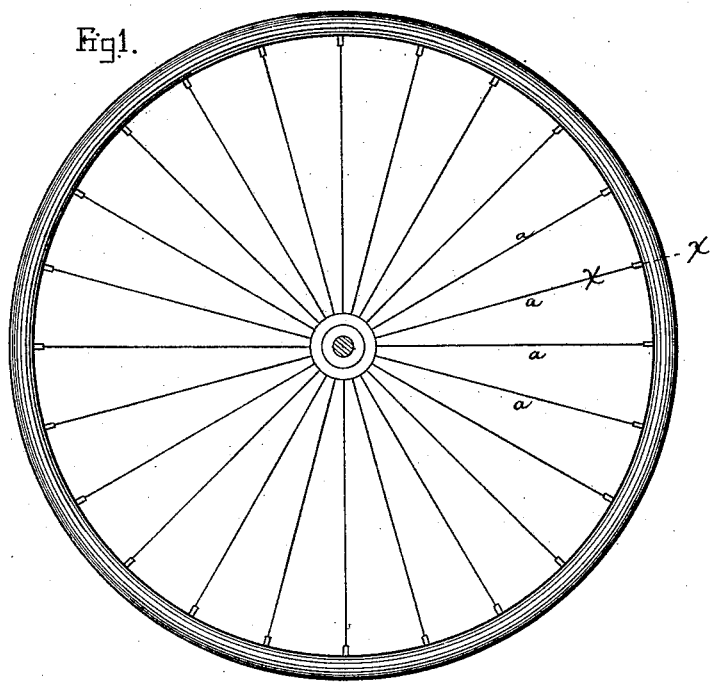
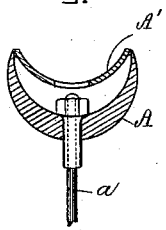
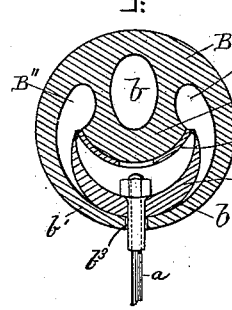
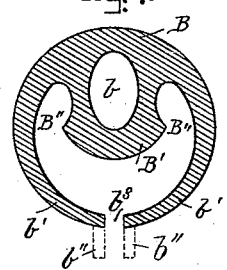
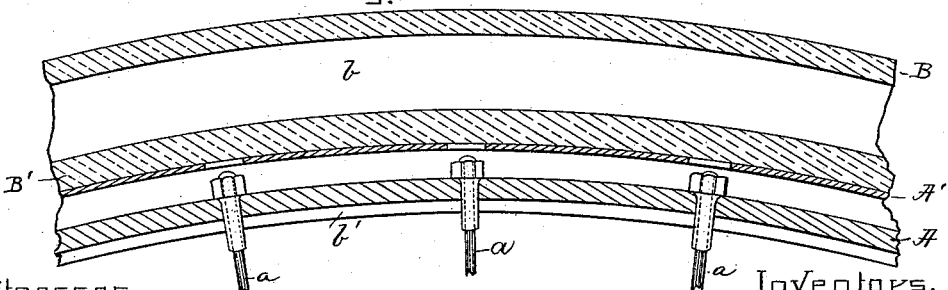
Witnesses.
Inventors.
George W. Toney, and
Murray V. Livingston
by Alban Andren, atty.

UNITED STATES PATENT OFFICE.

GEORGE W. TONEY, OF WESTBOROUGH, AND MURRAY V. LIVINGSTON, OF NEWTON, MASSACHUSETTS.

PNEUMATIC TIRE.

SPECIFICATION forming part of Letters Patent No. 472,411, dated April 5, 1892.

Application filed July 28, 1891. Serial No. 400,949. (No model.)

*To all whom it may concern:*

Be it known that we, GEORGE W. TONEY, a citizen of Great Britain, and a resident of Westborough, in the county of Worcester and State of Massachusetts, and MURRAY V. LIVINGSTON, a citizen of the United States, and a resident of Newton, in the county of Middlesex and State of Massachusetts, have jointly invented new and useful Improvements in Velocipede Cushion-Tires, of which the following, taken in connection with the accompanying drawings, is a specification.

This invention relates to improvements in velocipede cushion-tires; and it has for its object to enable cushion or pneumatic tires to be attached to ordinary narrow rims of velocipede-wheels, as will hereinafter be more fully shown and described, reference being had to the accompanying drawings, wherein—

Figure 1 represents a side elevation of a velocipede-wheel provided with our improved tire. Fig. 2 represents a cross-section of the velocipede-wheel rim to which our improved tire is applied. Fig. 3 represents an enlarged cross-section on the line X X, shown in Fig. 1. Fig. 4 represents a cross-section of our improved cushion-tire, and Fig. 5 represents a longitudinal section of a portion of the wheel-rim and improved tire.

Similar letters refer to similar parts wherever they occur on the different parts of the drawings.

The wheel-rim shown in the drawings is of the kind known in the art as a "hollow rim"—that is, a rim composed of the crescent or main portion A, to which the spokes $a$ $a$ are attached, as usual, and the tire-bed portion A′, as fully shown in Figs. 2, 3, and 5. Our improved cushion-tire may, however, be equally well applied to crescent rims or any of the grooved rims used on velocipedes.

The improved cushion-tire is made of rubber in a single piece and comprises an annular hollow tread portion B, an internal closed cavity or annular air-chamber $b$, formed in a convex annular base portion B′, at each side of which is a dead-air chamber B″. The tire is circular in cross-section, and its inner portion is formed with a continuous annular division-slot $b^3$, which divides this portion of the tire into a pair of independent laterally expansive or movable flaps or wings $b'$. The adjacent edges of these flaps or wings are separated from each other by the annular division-slot $b^3$, and the latter communicates with the dead-air chambers B″, whereby the two independent flaps or wings are adapted to be sprung around the inner side of the rim A, to which they are cemented. If desired, however, the adjacent edges of the independent flaps or wings $b'$ may be provided with projecting lips $b''$, as indicated in dotted lines, Fig. 4, by means of which these flaps or wings may be laced or clasped in position.

In placing this our improved cushion-tire on the rim of a velocipede-wheel all that is necessary to do is to expand the wings $b'$ $b'$ sufficiently to allow them to pass outside of and below the tire portion A, so as to permit the base portion B′ of said tire to be supported on the bed portion A′, and preferably cemented together at this place, the inner ends of the wings $b'$ $b'$ being likewise cemented to the inside of the rim A′, and, if so desired, still further secured to said rim by means of lacings or clasps, as hereinabove described.

The dead-air chambers B″ at opposite sides of the convex annular base portion B′ serve to impart elastic and yielding properties to the cushion-tire both as regards vertical or lateral concussions.

This our improved cushion-tire has all the advantages of a pneumatic one, is possessed of great elastic property, and can be applied with much ease to ordinary narrow rims or other rims now in use.

Having thus fully described the nature, construction, and operation of our invention, we wish to secure by Letters Patent and claim—

A cushion-tire consisting of a single piece of elastic material formed with an annular internal base portion B′, annular air-chamber $b$, auxiliary side chambers B at opposite sides of the base portion, and a pair of independent laterally-movable curved flaps or wings $b'$, having their adjacent edges separated by the annular division-slot $b^3$ for the purpose of springing such flaps or wings around opposite sides of a wheel-rim A, substantially as described.

In testimony whereof we have signed our names to this specification, in the presence of two subscribing witnesses, on this 25th day of July, A. D. 1891.

GEORGE W. TONEY.
MURRAY V. LIVINGSTON.

Witnesses:
ALBAN ANDRÉN,
ALICE A. PERKINS.